June 24, 1924.

E. ROBERTSON

INTERNAL COMBUSTION ENGINE

Filed Sept. 29, 1920

Inventor
Edmond Robertson
By Clarence Perdew
Attorney.

June 24, 1924.    E. ROBERTSON    1,498,757
INTERNAL COMBUSTION ENGINE
Filed Sept. 29, 1920    2 Sheets-Sheet 2

Inventor
Edmond Robertson
By Clarence Pordew
Attorney.

Patented June 24, 1924.

1,498,757

UNITED STATES PATENT OFFICE.

EDMOND ROBERTSON, OF NEWPORT, KENTUCKY.

INTERNAL-COMBUSTION ENGINE.

Application filed September 29, 1920. Serial No. 413,571.

*To all whom it may concern:*

Be it known that I, EDMOND ROBERTSON, a citizen of the United States, residing at Newport, in the county of Campbell and State of Kentucky, have invented certain new and useful Improvements in Internal-Combustion Engines, of which the following is a specification.

My invention relates to internal-combustion engines; and its object is to utilize heavier fuels of higher ignition points and less volatile, by the aid of a minor proportion of a more volatile and lighter fuel, of low ignition point. A further object is to utilize heat of compression for ignition, or aiding ignition, while avoiding excessive energy expenditure therein. Another object is to facilitate starting such engines. Also, an object in connection with any others herein mentioned is to maintain a simplicity of construction and operation, and an efficiency and reliability, that will make my invention as practicable as the internal-combustion engines of corresponding types heretofore used, while resulting in the increase of available fuel supply and decrease of fuel cost incident to the use of the mentioned kind of fuels in major proportion. Other objects will appear in the course of the ensuing description.

I attain these objects by the device illustrated, for example, in the accompanying drawings, in which—

Figure 1:
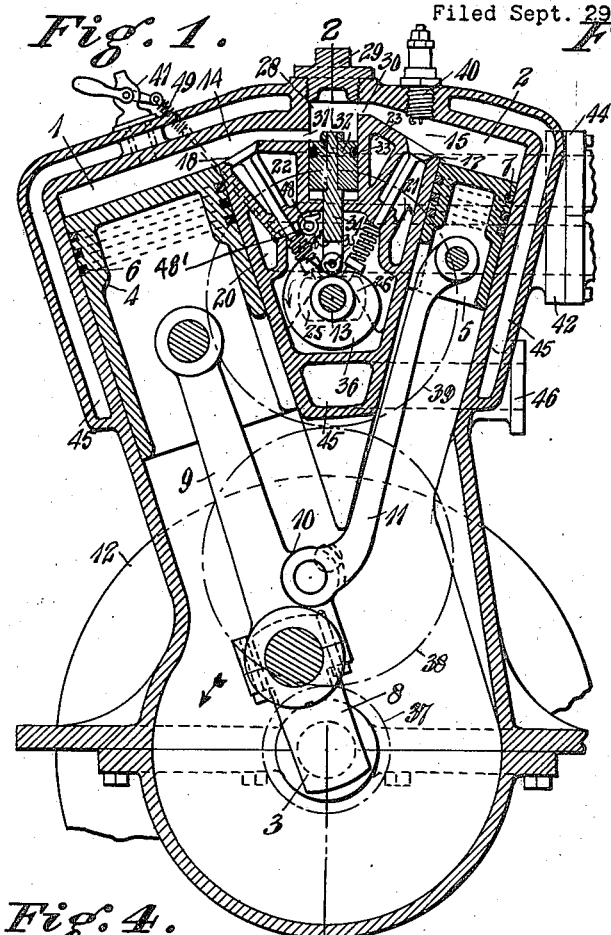
Fig. 1 is a vertical cross-section on a plane corresponding to the line 1—1 of Fig. 2, of an engine of the four-stroke cycle principle throughout, and with extraneous ignition source, constructed according to my invention.
Figure 2:
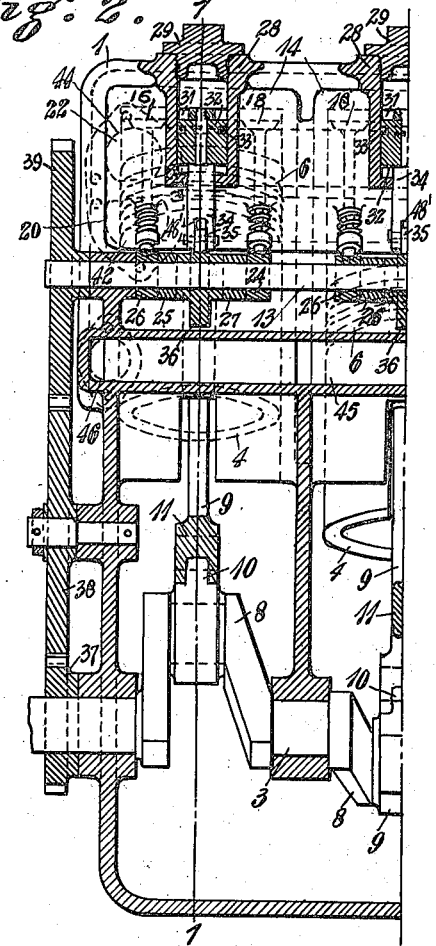
Fig. 2 is a partial vertical lengthwise section, on a plane corresponding to the line 2—2 of Fig. 1.
Figure 3:
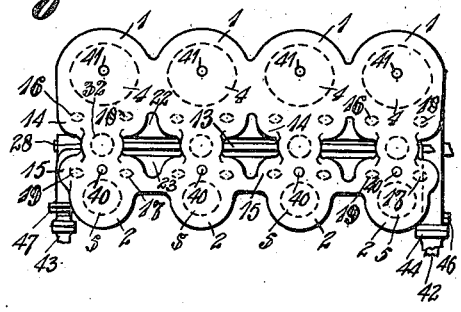
Fig. 3 is a plan view, on a reduced scale, of the engine of Figs. 1 and 2.

In the example of Figs. 1 to 3, inclusive, there is a set of large cylinders 1, in this case four in number, and a set of smaller cylinders 2, of the same number; the respective sets being in rows parallel with the crank-shaft 3, with their axes on radii diverging at a suitable angle from the crank-shaft axis to admit between the rows of cylinders 1 and 2 the desired valves and their operating mechanism, later to be described. The cylinders 1 and 2 have the pistons 4 and 5, respectively, of usual construction, with the usual rings 6 and 7, respectively. Each larger piston 4 is directly connected to a respective crank 8 of the crank-shaft 3 by a connecting-rod 9 having at one side of and just above its crank-end an ear 10 to which the smaller piston 5 is connected by a suitably curved connecting-rod 11. The connection of these rods is so relatively positioned that, with the angle of divergence of the cylinders as provided, the two pistons 4 and 5 will be approximately synchronized; the smaller piston 5, with the engine rotating its shaft over to the left, reaching the upper limit of its stroke, in toward the cylinder-head, only slightly earlier than the larger piston 4 reaches the corresponding position in its respective cylinder. In other parts of the stroke the discrepancy between the piston positions will vary somewhat; but in no case will this be of material effect, because, as will be seen, the two sets of cylinders and their associated respective operating parts act as two distinct engines on the common crank-shaft 3 at these other times. The crank-shaft has the usual fly-wheel 12 (Fig.1.)

The cam-shaft 13 is journaled parallel with the crank-shaft 3, between the sets of cylinders 1 and 2 and some distance below the valve-chambers 14 and 15 of the respective cylinders, which have, respectively, the inlet valves 16 and 17 and the exhaust valves 18 and 19, of the mushroom type, seating around the openings to corresponding inlet passages 20 and 21 and exhaust passages 22 and 23, through which the stems of the valves extend, radially to the cam-shaft 13, to bear on respective cams 24 and 25 and 26 and 27, fixed in the proper positions on the shaft 13, as is well known in the art.

An intermediate valve-chamber 28, in the form of a cylinder with its axis vertical, radial to the cam-shaft 13, is formed between the tops of the respective opposite cylinders 1 and 2 of each pair, with its upper end closed by a plug 29. It has a port 30 from its upper end laterally into the valve-chamber 15 of the smaller cylinder 2, and a port 31, some distance down, laterally into the valve-chamber 14 of the larger cylinder 1. The piston-valve 32 fits in this chamber 28, with its ring 33 adapted to be between the ports 30 and 31 when the valve 32 is at the upper limit of its stroke, but below the lower port 31 when the valve descends. The stem 34 of this valve 32 extends through the lower end of the chamber 28 and has on its lower end a roller 35 bearing on the periphery of a cam 36 fixed on the cam-shaft 13; the periphery consisting of a part of about 180° extent concentric with the shaft 13, and an opposite part of nearly the same extent curving gradually radially inward around to a rather abrupt drop from the concentric part. The cam-shaft 13, as here shown, is rotated at the required half-speed by the pinion 37 fixed on the crank-shaft 3, the idler-gear 38 journaled on a stud on the casing-end, and the gear 39 fixed on the end part of the cam-shaft 13; so that the cam-shaft 13 rotates over to the left as does the crank-shaft 3. Accordingly, the abrupt drop in the periphery of the cam 36 faces to the right in traveling under the valve-stem roller 35, permitting the valve 32 to descend quickly during this passage; and then for about the next half-revolution of the cam 36 the piston is gradually raised until its ring 33 again comes between the ports 30 and 31, in which position it is held by the concentric part of the cam, during the remaining nearly half-revolution, until the abrupt drop again reaches the roller 35. This drop is made to reach this point at about the end of the stroke in the two cylinders 1 and 2, as clearly seen in Fig. 1.

A suitable spark-plug 40 enters the valve-chamber 15 of the smaller cylinder 2. No ignition means is provided for the larger cylinder 1; but it has in its head a relief-cock 41. As indicated in Fig. 3, the inlet-pipes 42 and 43 for the large and small cylinders 1 and 2, respectively, are at opposite ends of the engine, leading to the respective passages 20 and 21, before mentioned; and the exhaust-pipe 44 leads from both exhaust passages 22 and 23, above the larger inlet pipe 42 (Fig. 1). The cylinders and valve-chambers are provided with a suitable water-jacket 45, which has inlet and outlet pipes, 46 and 47 respectively, at opposite ends of the engine; the former below and the latter above the adjacent inlet or exhaust pipes (Fig. 3). It will be understood that the inlet, exhaust, and intermediate valve equipment, and the ignition and relief equipment, just described as for one pair of cylinders, is duplicated for each pair, as indicated in Figs. 2 and 3; each pair of cylinders, as referred to, consisting of a large one and a corresponding small one, converging toward the common crank-shaft as described.

In this example of Figs. 1, 2 and 3, the fuel used in the larger cylinders 1 is supposedly light or volatile enough to be suitably atomized or vaporized to be drawn in with the air, through the inlet valves 16. For instance, kerosene or alcohol may, with pre-heating, be so vaporized; or they, or even solid fuel, as coal dust, may be simply comminuted finely enough to thus travel with the air. In the smaller cylinders 2 a highly volatile fuel, as gasolene, or in some cases, natural or producer gas, may be used; and owing to the relatively small quantity required, may be of high grade, easily ignited and producing a very hot combustion.

Supposing a combination of some such fuels to be used, and starting with the suction stroke of the large and small pistons, which, as before noted, may be treated as practically synchronized in all strokes, the cam 36 will be 180° from its position of Figs. 1 and 2, considering a single pair of cylinders with the understanding that the other pairs are at proper other stages of their operation. The cam 36 will thus have about completed the raising of the piston-valve 32, so that it prevents communication between the two cylinders 1 and 2 through the ports 31 and 30 and the chamber 28. Thus each piston 4 and 5 can draw into its respective cylinder 1 and 2 the kind of fuel therein to be used, along with the air, as usual. On compression stroke the valve 32 is still held up by the concentric part of the cam 36, as it was throughout the suction stroke; but at just about the completion of this stroke, as seen in Fig. 1, the drop of the cam 36 reaches the valve stem, and the valve 32 is allowed to quickly descend under the pressure of the compressed mixture in the clearance space and valve-chamber 15 of the small cylinder 2. The violence of this descent is counteracted by a trapping of air in the lower end of the valve-chamber 28 below the valve 32; and the drop of the cam is somewhat inclined to its radius, so that the descent is gradual but still very rapid.

This opens the passage between the clearance spaces and valve chambers of the two cylinders 1 and 2, and the compressed mixtures of the two are permitted to contact with each other. At about the same instant, by proper timing as is well known in the art, the spark-plug 40 is made to ignite the mixture of the small cylinder 2. This explosion acts in the usual way in the small cylinder 2, driving its piston 5 downward and doing work on the crank-shaft 3; and also, by its just permitted contact with the less readily ignited mixture of the large cylinder 1, the flame of its combustion, of sufficient volume and hotness to ignite any fuel, ignites the compressed mixture of the large cylinder 1, acting on the large piston 4, which also acts on the shaft 3 along with the smaller piston 5. During this working stroke the cam 36 is gradually raising the piston-valve 32 again; and this continues during the next return or exhaust stroke. Quick closure of the valve 32 is not necessary, as it is permissible for the combustion products of the two mixtures to mingle to the partial extent that they will with this valve open, during expansion and exhaust. The permissible high temperature of combustion in the small cylinder 2 will largely off-set carbonizing in the smaller cylinder 2, where this would promote premature ignition; burning out the carbon that would otherwise deposit from the invasion of low-grade products from the larger cylinder 1. Moreover, the area of inlet between the two cylinders rapidly decreases upon the initial raising of the valve 32 past the port 31. Variations of cam contour and timing of the various valves is of course possible, as may be found desirable in the design and operation of engines under various conditions.

To restrict the expansion in starting, when the relief-cock 41 is opened, the piston-valve 32 may be held up by the dog 48 put under the spring pressure of the resilient connection 49 from an arm on the dog 48 to an arm on the relief-cock handle. The dog 48 of each pair of cylinders will thus spring under the detent shoulder 48' of the piston-valve stem as the respective stem and valve are raised by the cam 36. Closing the relief-cock will remove this pressure, leaving the piston-valve 32 of each pair of cylinders free to operate.

It will be understood that the fuel supply may also be temporarily shut off from the larger cylinders 1 while the relief-cock 41 is opened. Thus the larger pistons 4 will be running substantially idle during starting, ready to effect their compressions under the momentum derived from the driving by the smaller cylinders, when the relief-cocks are closed and the fuel supply opened into the larger cylinders 1. The piston-valves 32 also being released from the dogs 48, these will then admit combustion from the smaller cylinders, and the normal operation of the complete engine will be established. Such temporary rendering of the large cylinders inoperative relieves the starter, either manual or power-operated, of the resistance of compression in the large cylinders 1. This further contributes to the possibility of increasing the degree of compression in the large cylinders, in cases where heavy compression in an engine has been considered objectionable in view of the difficulty of starting by simple means.

It will be seen that, while the small engine, or small cylinder, acts as ignition and starting means for the larger engine or cylinder, it is not a mere addition for this purpose, but acts fully to supply its share of driving energy throughout the operation. In the small cylinder, using fuel of low ignition point, the compression is not carried so high as in the large cylinder, using fuel that can be highly compressed without danger of preignition. The lowering of efficiency by lowering compression in the small cylinder is thus not so marked as where readily combustible fuel is the only fuel, with a cylinder large enough to develop the full power of the engine; and ignition of the heavy fuel is accomplished with great certainty without the necessity of excessive compression, to aid its ignition, as in an engine using the heavy fuel solely. The premature ignition of such heavy-fuel engines is also avoided under these circumstances. The compression in the large heavy-fuel cylinder is carried only as high as is desirable for developing heavy impelling effect upon expansion.

Figure 4:
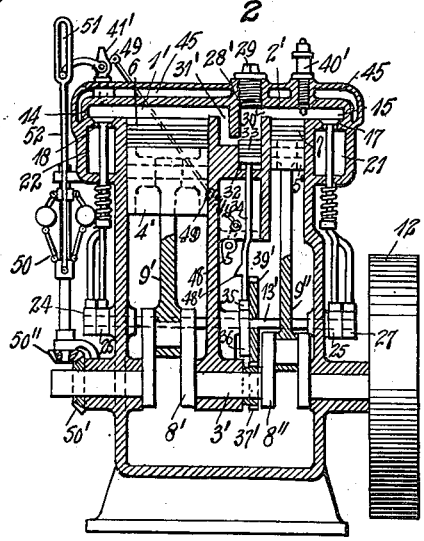
Fig. 4 is a vertical section on the plane of the crank-axis, of an engine similar to that of Figs. 1, 2 and 3, but of modified arrangement of parts.

In Fig. 4, the cylinders 1' and 2' are arranged along the crank-shaft 3', parallel with each other, and the shaft has the two cranks 8' and 8" with connecting-rods 9' and 9" to the pistons 4' and 5', respectively. Here, the cranks 8' and 8" may be on the same radius, with actual synchronism of the two pistons. The camshaft 13', through one side of the upper part of the crank-case, is geared to the crank-shaft 3' by the pinion 37' and gear 39'; and the shaft 13' carries the cam for operating the usual inlet and outlet valves in their chambers at opposite sides of the engine, and the cam for operating the intermediate valve as in the other example: these parts being numbered as before. The chamber 28' of the intermediate piston-valve 32 has its ports 30' and 31' communicating directly with the adjacent sides of the respective cylinders 2' and 1'; the port 31' leading up along the cylinder wall from its lower entrance in the intermediate-valve chamber to its upper outlet into the cylinder 1' at the top of the latter. Other parts of this engine, including its spark-plug 40', are as in the preceding example, except that they are slightly differently shaped in accordance with the different arrangement. The relief-cock 41' of the larger cylinder 1' has the handle for manual opening and closing, as in the preceding example. Also, there is mechanism for automatically closing it when the engine reaches a desired speed with sufficient momentum to effect compression in the large cylinder, as before described. This mechanism comprises a centrifugal governor 50 driven by the crank-shaft 3' by means of bevel gears 50' and 50''. An additional arm on the handle of the relief-cock 41' engages in the upright slot 51 of the rod 52 connected to the governor 48 to be raised as speed increases and to fall as speed decreases. Thus, while the engine is stopped, this rod 52 is down, and permits manual opening of the cock 41'; but when the speed of the engine has risen far enough, the governor has raised the rod enough to close the cock 41'. Any momentary loss of speed during the engine operation will lower the rod but will not close the relief-cock 41', as it would without the slot and merely pivoted to the handle of the relief-cock. It will be understood that this automatic device is equally applicable to the example of Figs. 1 to 3, inclusive. The operation of this engine of Fig. 4 is substantially the same as that just described for the first example.

Figure 5:
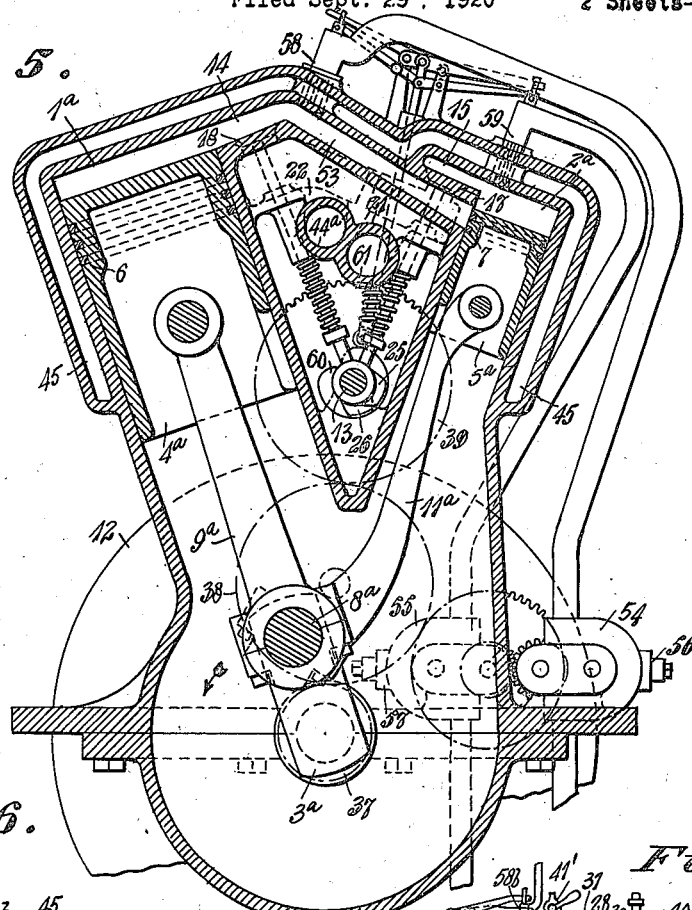
Fig. 5 is a view similar to Fig. 1, showing an engine of the four-stroke cycle principle throughout, as in the preceding examples, but adapted to utilize heavier fuels throughout, and to ignite by heat of compression.

In Fig. 5 the two cylinders $1^a$ and $2^a$ converge toward the axis of the crank-shaft $3^a$ as in Figs. 1, 2 and 3, and have pistons $4^a$ and $5^a$, respectively, of usual kind. The single crank $8^a$ of the crank-shaft receives both rods $9^a$ and $11^a$ directly; so that, due to the angle between the cylinders, the small piston travels slightly ahead of the large piston on the upward stroke. The cam-shaft and the inlet and outlet valves and associated parts are substantially like those of the first example, except for slightly different arrangement and proportion, and are correspondingly numbered. There is no intermediate valve 32, however. The inter-cylinder port or passage 53 leads from the smaller cylinder $2^a$ some distance down from the upper end thereof, and runs upward into the upper end of the larger cylinder $1^a$, through the valve chamber 14 thereof. This permits the rings 7 of the small piston $5^a$ to pass above this port and thus trap the air or mixture thereabove for extra high compression. This engine is shown as being equipped for use of fuels to be injected into the air compressed in the respective cylinders, and there ignited. The fuels are preferably different for the two cylinders, forced in by two pumps 54 and 55 driven from the camshaft gearing, and having by-passes with valves 56 and 57 that open when the fuel-inlet valves 58 and 59 of the cylinders $1^a$ and $2^a$ are closed. These valves, it will be understood, may be of any suitable kind well known in the art, requiring no detailed disclosure; being both opened at the same time under control of a cam 60 on the cam shaft. As merely air is admitted by the inlet valves of both cylinders, a single inlet pipe 61 and a single exhaust pipe $44^a$ are sufficient for both cylinders. The relief-cock is not shown in this example; as the small cylinder, with its excessive compression, is not adapted for easy starting of the engine. This engine would be started by any suitable well known method of starting engines of the compression-igniting type; or such accessories may be included in its construction as to permit it to be temporarily relieved of its high compression, with ignition from an extraneous source, as with any engine of this type.

In this example, the small piston functions as the intermediate valve; being far enough ahead of the large piston to complete its compression of the trapped air, which receives its fuel at the end of the compression and then expands, forcing the small piston downward and doing work on the crank-shaft. Part of this work is performed in completing the compression in the large cylinder as the small piston is traveling back down to the inter-cylinder port 53, which port it passes and leaves open, for the combustion of the small cylinder to ignite the fuel that has been injected into the large cylinder during the last stages of compression therein. It is thus not necessary to excessively compress the large volume of air in the large cylinder, as it is ordinarily in this type of engine to raise the temperature to the ignition point of the fuel. Also, because the flame ignition from the small cylinder is used, the fuel of the large cylinder can have practically any low ignition point, and as it is forced in without dependence on the air inlet, it can be of practically any heaviness. With suitable injecting means, solid fuels may be used in the form of fine dust, as well as any fluid fuels capable of being sprayed through suitable injecting means. Such engines may thus be worked, with a high degree of certainty and regularity, on such fuels as coal dust, heavy crude oils and the like. In the small cylinder, due to the comparatively small volume, fuels of low ignition point can be used, with added certainty and regularity of firing by the heat of compression, without the aid of extraneous heating devices, as are usually necessary with the lower grade fuels used in engines of this type ordinarily.

Figure 6:
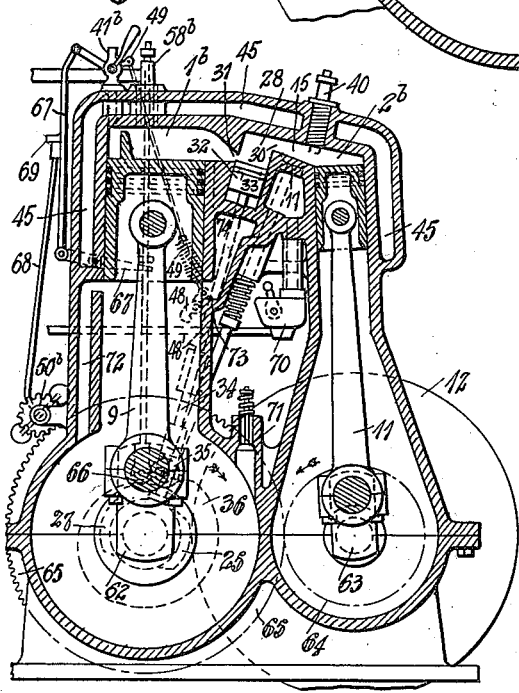
Fig. 6 is a similar view of an engine depending upon extraneous source of ignition, as in Figs. 1 to 4, inclusive, but being partly of the two-stroke and partly of the four-stroke cycle principle.

In Fig. 6, the large cylinder $1^b$ has its parts arranged for two-stroke cycle operation, and the small cylinder $2^b$ is arranged for four-stroke cycle operation, with its inlet and exhaust valves controlled by cams on the crank-shaft 62 of the large cylinder; there being a separate crank-shaft 63 for the small cylinder, and these two being geared together by the pinion 64 on the small-cylinder shaft 63 meshing with a gear 65 twice its diameter on the large-cylinder shaft 62.

The intermediate piston-valve 32 between the two cylinders is worked also under control of the cam 36 on the large-cylinder crank-shaft 62; and the fuel-inlet valve 58$^b$ is also controlled by a cam 66 on this shaft. The various details of this engine similar to those of the first example are correspondingly numbered. This engine has a governor 50$^b$ which is driven from the gear 65; and the relief-cock 41$^b$ has its handle connected to a lifter 67 so that when the relief-cock is opened the fuel-inlet valve connection is lifted off its cam, keeping the fuel out of the large cylinder, while the governor has a connection 68 engaging with a projection 69 on the lifter connection, to restore the parts to normal positions upon attainment of the required speed and momentum by the engine, after starting. The small four-cycle engine is fed through the carburetor 70. The larger two-cycle engine takes air into its crank-case, which is made distinct from the small-engine crank case, through the check valve 71, passing the compressed air to the combustion space through the port 72; and the exhaust is through the port 73 into the exhaust pipe 74, which also receives the exhaust of the four-cycle engine. These parts are similar to those of any two-cycle engine. It will be seen that, as the four-cycle engine is driven at twice the speed of the two-cycle engine, the latter requiring ignition at each revolution and the former firing, under action of its spark-plug 40 at each alternate revolution, the ignition of the larger more slowly moving two-cycle engine will be provided by the smaller four-cycle engine, through the inter-cylinder passage controlled by the intermediate valve 32, which is completely closed at each expansion stroke of the two-cycle engine, to remain closed throughout the compression stroke, up to the point of firing. The two-cycle engine can thus use low grade fuel, with which its characteristic lack of fuel economy will not be so serious; while the four-cycle engine can be more dependable as igniting means using light fuel of low ignition point which makes trouble in the two-cycle engine by ignition in the crank-case during pre-compression, and of which the waste, due to mixing of fresh mixture with the scavenged products in the two-cycle engine, is more serious. Thus, for instance, high-grade gasoline can be used in the small four-cycle engine, and crude oil or the like can be the fuel of the large two-cycle engine. The advantage of the two-cycle engine is of course its simplicity, and its working through every revolution.

Figure 7:
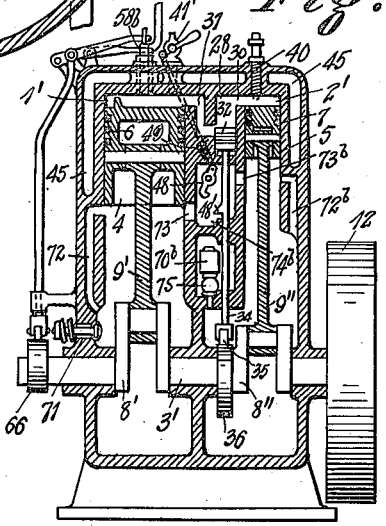
Fig. 7 is view similar to Fig. 4, showing an engine similar to that of Fig. 4, but being of the two-stroke cycle principle throughout.

In Fig. 7, both the large and the small engine are of the two-stroke cycle kind; accordingly being provided with a single crank-shaft, and being parallel and arranged along the shaft, as in the completely four-cycle engine of Fig. 4. Here, the only valves required to be actuated are the intermediate valve 32 and the fuel-inlet valve 58$^b$, and these are actuated by respective cams on the crank-shaft. Those parts similar to those of Fig. 6 are correspondingly numbered. The small-engine crank-case has the carburetor 70$^b$ with the check-valve 75 interposed; and has ports 72$^b$ and 73$^b$ corresponding to the ports of the larger engine. Both exhaust ports 73 and 73$^b$ lead into the exhaust conduit 74$^b$. The small engine will thus operate on a mixture of high grade fuel and air, taken through its crank-case, and the large engine will take air through its crank-case, to receive injections of low-grade fuel at end of compression, at which point the intermediate valve 32 will open, so that the combustion, started in the small engine by the spark-plug 40, ignites the fuel in the compressed charge of air in the larger engine. Thus both engines act at each revolution; and the energy from both cylinders is exerted on the crank-shaft, as with any multiple-cylinder engine, while the cylinder-to-cylinder ignition is accompanied with the advantages hereinbefore enumerated for the other examples, subject to the peculiarities of the two-cycle engine principle.

Instead of the single small four-cycle engine running at twice the speed of the larger two-cycle engine in Fig. 6, two small four-cycle engines, combined therewith in every way as shown in Fig. 6, except that one four-cycle engine is 180° around from the other two engines, on the same crank-shaft, similarly to Figs. 4 and 7, will provide the ignition at every revolution of the two-cycle engine, without running the four-cycle engines any faster. Such engines, however, should be very small, to retain the proportion with the large engine. One of the highly desired conditions of my invention is the relative smallness of the cylinder and piston that utilizes the higher grade and more expensive fuel. For instance, in Fig. 1 the larger cylinder is twice the diameter of the smaller one, thus having four times the area; so that the work done, supposing equal pressures in the two, by the low-grade fuel is 80% of the total work of the engine. In addition, the mixture in the small engine need not be so rich, merely for ignition purposes, and incidental driving action, as where it is the sole driving means; so that the low-grade fuel consumption, and the work done by the low-grade fuel, may be considerably more than 80% of the total of the engine.

It will be understood that in any of the examples of Figs. 4 to 7, inclusive, where a single pair of cylinders is shown in each instance, and described as such, any plurality of pairs may make up the complete engine, after the manner of Figs. 2 and 3; or, in Figs. 4 and 7, the pairs may simply be duplicated along the crank-shaft, with large and small cylinders alternating in the arrangement. Other modifications will occur, and different combinations of the disclosed examples, as well as constructions and arrangements involving details not herein disclosed. Therefore, while certain constructional details and arrangements are deemed preferable in connection with my invention, and I have shown and described these rather specifically in elucidating the construction and use of my invention, as is required, I do not wish to be understood as being limited to such precise showing and description.

In any example there is a plurality of combustion chambers, as the cylinders with their respective combustion spaces defined by them and their pistons, which latter, together with their connected rods and crank-shaft or crank-shafts constitute means for mechanically exerting the energy of the combustion in the respective spaces or chambers. The piston-valve 32, or in Fig. 5 the small piston itself, maintain the compressions in the two cylinders or combustion chambers distinct throughout the proper periods; and the ports or passage which such a valve or piston controls communication through will be understood to be the means whereby the combustion in one chamber is communicated to the other chamber. Having thus fully disclosed my invention, what I claim as new and desire to secure by Letters Patent is:

1. An internal-combustion engine comprising a plurality of combustion chambers, means for supplying fuel to said chambers, energy-utilizing mechanisms for the respective chambers, operating in substantially coincident cycles, whereby energy of combustion in said chambers is mechanically exerted substantially in unison, means whereby combustion is initiated in one of said chambers, and means whereby said combustion is communicated to another one of said chambers.

2. An internal-combustion engine comprising a plurality of combustion chambers, means for supplying fuel to said combustion chambers and means for causing compression in said chambers, means whereby combustion is initiated in one of said chambers, means whereby said combustion is communicated to another one of said chambers, means whereby energy of combustion in each one of said chambers is mechanically exerted in both of said chambers, and means for temporarily relieving the compression in said other one of said chambers.

3. An internal-combustion engine comprising a plurality of combustion chambers, means for supplying fuel to said combustion chambers and means for causing compression in said chambers, means whereby combustion is initiated in one of said chambers, means whereby said combustion is communicated to another one of said chambers, means whereby energy of combustion in each one of said chambers is mechanically exerted in both of said chambers, means for temporarily relieving the compression in said other one of said chambers, and means actuated incident to an increase of speed of said engine, to discontinue the relief of said compression.

4. An internal-combustion engine comprising a plurality of combustion chambers, means for supplying distinct charges of fuel to the respective chambers and means for causing compressions in said chambers, means whereby combustion is initiated in one of said chambers, means whereby said combustion is communicated to another one of said chambers, means whereby energy of combustion in each one of said chambers is mechanically exerted in both of said chambers, means for temporarily relieving the compression and preventing the supply of fuel in said other one of said chambers, and means actuated incident to an increase of speed of said engine, to discontinue the relief of said compression and restore said fuel supply.

5. An internal combustion engine comprising a plurality of combustion chambers, means for supplying fuel to said combustion chambers and means for causing compressions in said chambers, means whereby combustion is initiated in one of said chambers, means whereby said combustion is communicated to another one of said chambers, means whereby energy of combustion in each one of said chambers is mechanically exerted in both of said chambers, means for temporarily relieving the compression in said other one of said chambers, a governor operated by said engine, and an operative connection from said governor to said means for compression relief, having lost motion, whereby said governor, upon increase of speed of said engine, discontinues said relief but does not cause resumption of said relief upon subsequent reductions of the engine speed.

6. An internal-combustion engine comprising a plurality of combustion chambers, means for supplying distinct charges of fuel to the respective chambers and means for causing compressions in said chambers, means whereby combustion is initiated in one of said chambers, means whereby said combustion is communicated to another one of said chambers, means whereby energy of combustion in each one of said chambers is mechanically exerted in both of said chambers, means for temporarily relieving the compression and temporarily preventing supply of fuel in said other one of said chambers, a governor operated by said engine, and an operative connection from said governor to said means for compression relief and fuel-supply prevention, having lost motion, whereby said governor, upon increase of speed of said engine, discontinues said relief and restores said fuel supply but does not cause resumption of said relief or repeated prevention of fuel supply upon subsequent reductions of the engine speed.

7. An internal-combustion engine comprising a plurality of combustion chambers, and means for causing compression in said chambers, means for temporarily relieving the compression in one of said chambers, means whereby combustion is initiated in another one of said chambers, means whereby said combustion is communicated to said one of said chambers during normal operation of said engine, means for preventing this communication during relief of said compression, and means whereby energy of combustion in each one of said chambers is mechanically exerted in both of said chambers.

EDMOND ROBERTSON.